Feb. 4, 1964  D. L. GEIGER  3,120,342
SLIDE RULE
Filed Oct. 16, 1958  2 Sheets-Sheet 1

INVENTOR.
DARRELL L. GEIGER
BY Hudson, Boughton
Williams, Davis & Hoffmann
ATTORNEYS Feb. 4, 1964         D. L. GEIGER         3,120,342
SLIDE RULE Filed Oct. 16, 1958         2 Sheets-Sheet 2

INVENTOR.
DARRELL L. GEIGER
BY Hudson, Doughton,
Williams, David & Hoffmann
ATTORNEYS

United States Patent Office 3,120,342
Patented Feb. 4, 1964

3,120,342
SLIDE RULE
Darrell L. Geiger, Bay Village, Ohio, assignor to Cleveland Institute of Radio Electronics, Cleveland, Ohio, a corporation of Ohio
Filed Oct. 16, 1958, Ser. No. 767,699
16 Claims. (Cl. 235—70)

This invention relates to calculating devices of the slide rule type having relatively movable members carrying graduated scales and, as one of its objects, provides a novel form of slide rule usable for a quick and easy solution of certain mathematical problems in the field of electricity, and particularly in radio electronics, which heretofore could be solved by the use of a slide rule only with great difficulty and with doubtful accuracy in the result. The expression "slide rule" as used herein is intended to include devices comprising relatively arcuately movable members, as well as devices comprising relatively longitudinally movable members.

Another object is to provide a novel slide rule having graduated scales and associated indicia of such form that mathematical problems can be readily solved without need for conversion from one unit of measure to another for the values being handled.

A further object is to provide a novel slide rule having graduated scales and associated indicia of such form that an accurate determination of the correct decimal point location is obtainable immediately and directly in the solution obtained of the problem being worked.

Still another object is to provide a novel slide rule having relatively movable members carrying graduated scales and associated indicia and wherein the indicia comprises symbols and numbers, the symbols being conventionally recognized as representative of different unit values of certain electrical properties and the numbers being representative of different multiples of such unit values.

Figure 1:
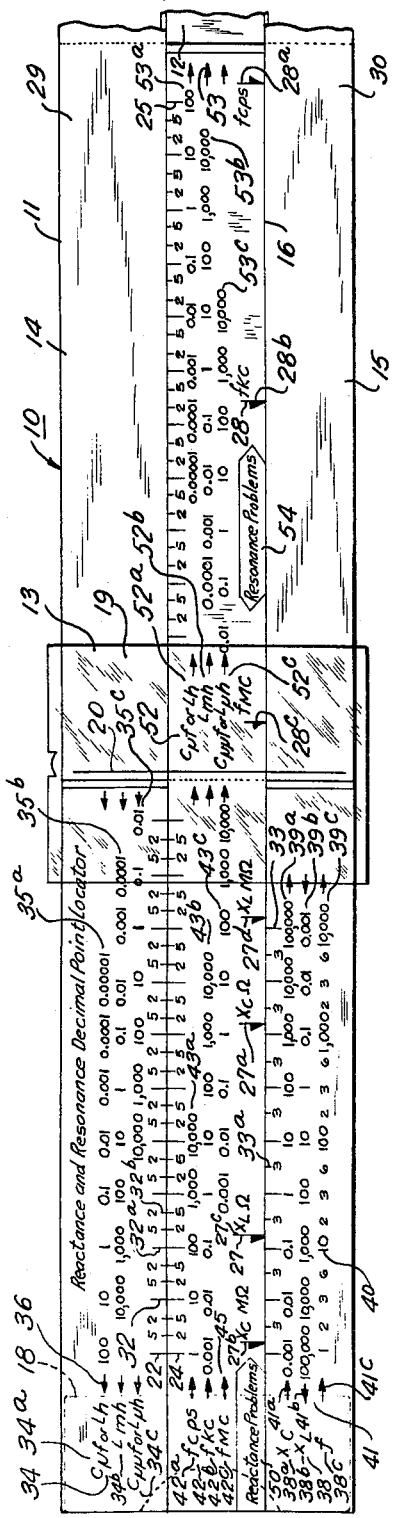
Figure 2:
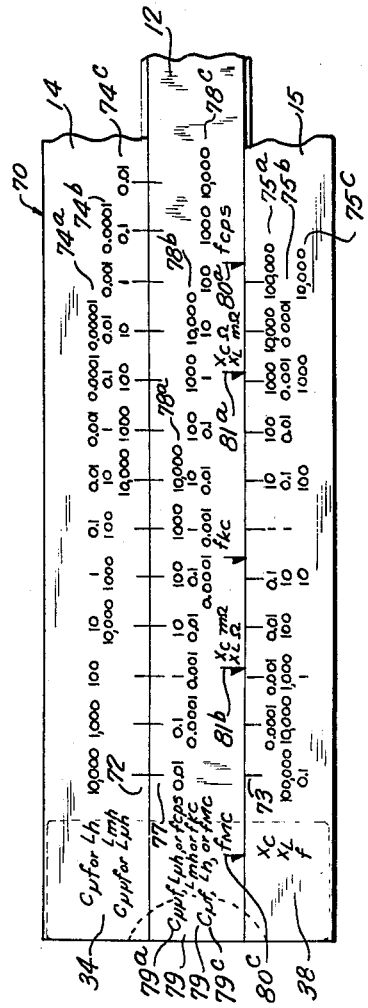

Other objects and advantages of this invention will be apparent in the following detailed description and in the accompanying drawings forming a part of this specification and in which, FIG. 1 is a partial plan view of one side of a slide rule of the construction provided by this invention;

FIG. 2 is a partial plan view showing a modified form of the slide rule; and

Figure 3:
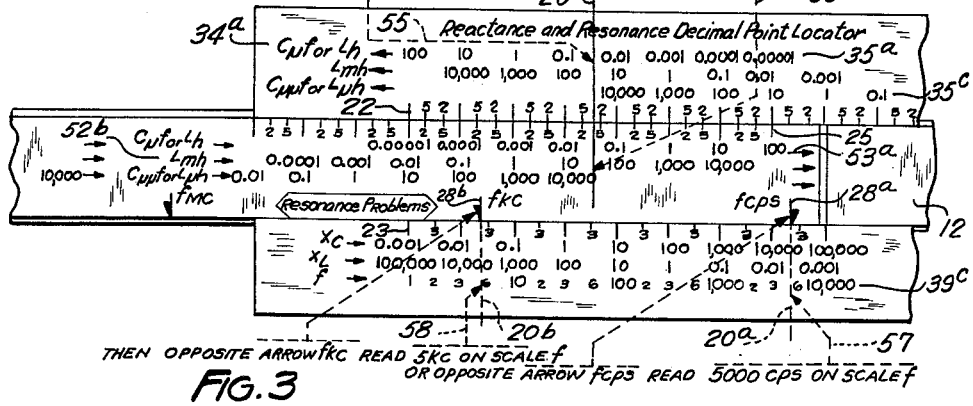
Figure 4:
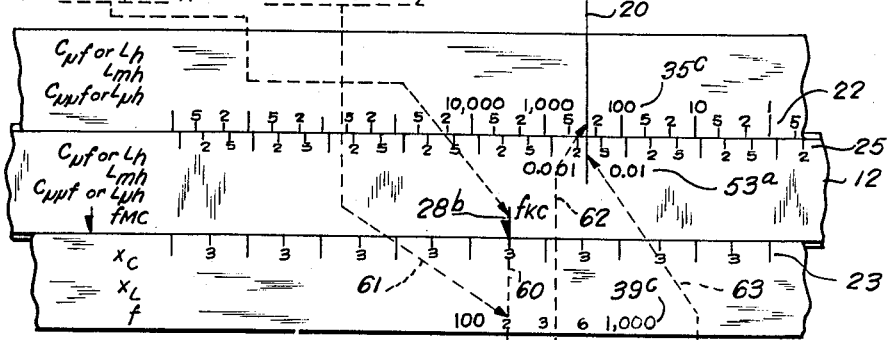
Figure 5:
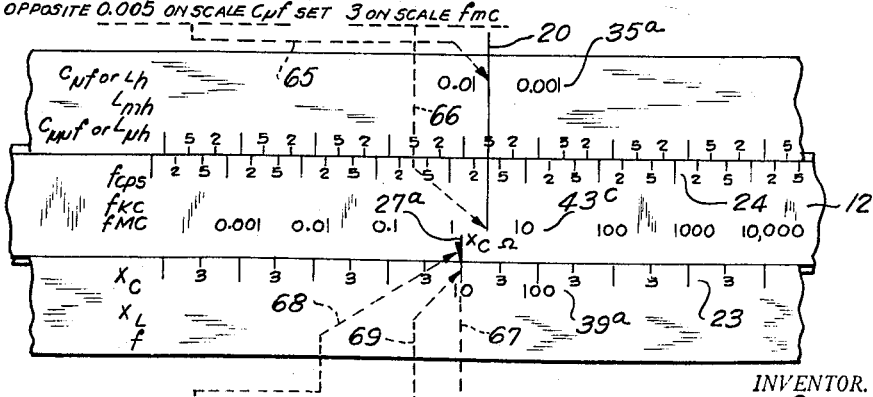

FIGS. 3, 4 and 5 are partial plan views illustrating the use of the slide rule of FIG. 1 in the solution of typical problems in the field of radio electronics; FIG. 3 representing the solution of a problem in which the frequency of oscillation of a resonant circuit is the value to be determined; FIG. 4 representing the solution of a problem in which the value of capacitance needed in a given resonant circuit is to be determined; and FIG. 5 representing the solution of a problem in which the value of capacitive reactance is to be determined.

As representing a practical embodiment of the present invention, FIG. 1 shows a slide rule 10 having graduated scales and associated indicia thereon, as will be pointed out and described in detail hereinafter, and intended for the mathematical solution of certain problems in the electrical field and particularly in the portion of the electrical field which relates to radio electronics. The slide rule 10 comprises, in general, a body 11, a slide member 12, and a movable indicator 13.

The body 11 is here shown as comprising a pair of flat parallel bars or body members 14 and 15 spaced apart so as to provide a longitudinal guideway 16 therebetween and which body members appear, in FIG. 1, in a relation such that the body member 14 is the upper member and the body member 15 is the lower member.

The body members 14 and 15 are secured together in the spaced and parallel relation just described by suitable transverse connecting means, such as connecting bars or brackets 18 located at the ends of the body 11 and which rigidly connect the body members without obstructing the guideway 16.

The slide member 12 is here shown as being in the form of a flat bar slidable longitudinally in the guideway 16 and being of a width to fill the guideway so that the co-operating edges of the slide member and the body members 14 and 15 will lie in a close fitting relation, as is conventional and desirable in slide rules, and which provides for registering cooperation between the graduated scales of the members as will be described hereinafter.

The indicator or cursor 13 can be of a conventional form and includes a transparent body or panel 19 carrying a hairline 20. The indicator 13 is mounted on the body 11 for sliding movement longitudinally therealong in opposite directions and is disposed with the hairline 20 extending transversely across the slide member 12 and across the body members 14 and 15.

The slide rule 10 carries graduated scales 22 and 23, which are located on the upper and lower body members 14 and 15 and extend along the edge portions of these members which are presented to the guideway 16, and indicia also located on these body members and associated with the graduated scales thereof as will be described hereinafter. The slide rule 10 further includes two graduated scales 24 and 25 carried by the slide member 12 and extending along longitudinal portions thereof, and certain indicia associated with these graduated scales as will be described hereinafter. The scales 24 and 25 of the slide member 12 extend along the edge portion of this member which is presented toward the upper body member 14. Additionally, the slide rule 10 carries groups of transversely extending indicator marks 27 and 28, preferably arrows, located on the slide member 12 at spaced points therealong and having their apices located at the edge of this member which is presented toward the lower body member 15.

In the accompanying drawings the graduated scales 22, 23, 24 and 25, the indicia associated with these scales, and the indicator marks 27 and 28 are shown as occupying only a portion of the surface of the slide rule 10 and, if desired, these designations may comprise all or the major portion of the data intended to be carried by the slide rule. Usually, however, and as shown in FIG. 1, this data will occupy only a portion of the surface of the slide rule so that various other portions, such as the surface portions 29 and 30 which are here shown as having been left blank, can be used for various other data. The reverse side of the slide rule 10 will usually also be provided with other data including desired scales and indicia.

Before proceeding further with the detailed description of the scales 22, 23, 24 and 25 and their associated indicia, an explanation can advantageously be given of the field of use for which this slide rule is intended and the type of problems to which it is intended to be applied. As has already been indicated above in a general way, the slide rule 10 is usable to advantage in the electrical field and particularly in the portion of that field having to do with radio electronics. Radio technicians, engineers and others are frequently confronted with mathematical problems concerning the oscillation frequency of a resonant circuit and concerning the mathematical values of various electrical properties of such a circuit or of the components thereof, such as resistance, capacity, inductive reactance and capacitive reactance.

To further illustrate the kind of mathematical problems encountered by radio technicians, and others, and for the solution of which the slide rule 10 has been designed, three equations are given as follows as being representative of those problems:

(Equation 1) $$f = \frac{1}{2\pi\sqrt{LC}}$$

in which $f$ is oscillation frequency in cycles per second; L is inductance in henrys; and C is capacitance in farads.

(Equation 2) $$x_c = \frac{1}{2\pi fC}$$

in which $X_C$ is capacitive reactance; $f$ is oscillation frequency in cycles per second; and C is capacitance in farads.

(Equation 3) $$x_L = 2\pi fL$$

in which $X_L$ is inductive reactance; $f$ is oscillation frequency in cycles per second; and L is inductance in henrys.

In the three equations given just above it will be observed that each equation contains three unknown quantities. It will therefore be recognized that in the solutions of these equations for the unknown quantities thereof there will be a possible total of nine different problems to be solved.

In the usual solution of mathematical problems of the kind represented by the above equations, it is necessary to convert one or more of the various values from one unit of measure to another. Thus, for example, the value of capacitance can be expressed in farads, microfarads, or micromicrofarads. Likewise the value of inductance may be expressed in henrys, millihenrys or microhenries. The value of oscillation frequency may be expressed in cycles per second, kilocycles per second or megacycles per second, and similarly, the values of reactance may be expressed in ohms or megohms.

One of the important advantages of the slide rule 10, as will be explained in detail hereinafter, is that this conversion from one unit of measure to another which has heretofore been unavoidable in the solution of problems in radio electronics, now becomes unnecessary.

It has been conventional in the field of electricity and radio electronics to designate units of measure, used for various different electrical properties of the kind mentioned just above, by different symbols. Since a number of these conventional symbols appear in the indicia used on the slide rule 10, various ones of these conventional symbols and the recognized meanings thereof are given hereunder.

$C_{\mu f}$ means capacity in microforads.
$C_{\mu\mu f}$ means capacity in micromicrofarads.
$L_h$ means inductance in henrys.
$L_{mh}$ means inductance in millihenrys.
$L_{\mu h}$ means inductance in microhenrys.
$f$ means oscillation frequency in cycles per second.
$f_{kc}$ means oscillation frequency in kilocycles per second.
$f_{mc}$ means oscillation frequency in megacycles per second.
$X_C\Omega$ means capacitance reactance in ohms.
$X_C M\Omega$ means capacitance reactance in megohms.
$X_L\Omega$ means inductive reactance in ohms.
$X_L M\Omega$ means inductive reactance in megohms.

In dealing with electrical properties and values in problems of the kind referred to above, very large and very small values will be encountered. This makes the solution of the problems on a conventional slide rule very difficult, particularly with respect to the correct location of the decimal point. Another important advantage of the slide rule 10 is that the correct location of the decimal point is easily and correctly determined directly from the scales and indicia provided on the slide rule, as will be further explained hereinafter.

To further point out the difficulty presented by the above-indicated problems with respect to the decimal point location, it is pointed out that when capacitance is referred to as being in microfarads, it will be expressed by a numerical value in millionths of a farad, or decimal-wise, by a numerical value of $10^{-6}$. Likewise, when the value of capacitance is expressed in micromicrofarads, it will be expressed decimal-wise by a numerical value of $10^{-12}$. Similarly, an inductance in millihenrys will be expressed numerically in thousands of henrys, or decimal-wise, by a numerical value of $10^{-3}$ and microhenrys will be expressed decimal-wise by a numerical value of $10^{-6}$. With respect to oscillation frequencies, a designation in kilocycles represents thousands of cycles, and when expressed in megacycles means millions of cycles per second. In the case of reactance, the value thereof expressed in megohms would be in millions of ohms. From the range of values indicated just above, the seriousness and difficulty of the decimal point location is readily apparent when the solution of a problem involving such numerical values is attempted on a slide rule.

Reverting now to FIG. 1 of the drawings, the characteristics of the graduated scales, the indicia and indicator marks will now be described. The scales 22, 23, 24 and 25 all are graduated lineal scales, that is, scales in which the graduation marks of each scale are spaced apart at substantially equal distances therealong. In the case of the scales 22, 24 and 25, the graduation marks 32 thereof are spaced apart by the same equal distances. These three scales are here shown as being of the same identical length and have the same number of graduations.

In the scales 22, 24 and 25 the graduations comprise main graduation marks 32$^a$ and intermediate or secondary graduation marks 32$^b$. Two of the intermediate graduation marks 32$^b$ are located at spaced points between each pair of main graduation marks 32 so as to divide the distance between each such pair of main graduation marks into three spaces whose lengths relative to each other are represented by the integers 3, 4 and 3 which have a total value of 10. The end spaces corresponding in value with the integers 3 are of equal length and the center space corresponding with the integer 4 is relatively longer.

The graduated scale 23 of the lower body member 15 comprises main graduation marks 33 and intermediate graduation marks 33$^a$. In this case the spaces between each pair of main graduation marks 33 is divided into two intermediate spaces of equal length which is accomplished by the use of a single intermediate graduation mark 33$^a$ between each such pair of main graduation marks. The intermediate graduation marks 33$^a$ are each provided with the numeral 3. The numerical designations for the intermediate graduation marks 33$^a$ are only approximate as to the division of the distances between the main graduation marks 33 but is appropriate and suitable for the uses of the slide rule 10.

Reference has been made hereinabove to indicia provided on the slide rule 10 and associated with the graduated scales 22, 23, 24 and 25. This indicia will now be described and comprises symbols or groups of symbols and numbers or rows of numbers. In the case of the graduated scale 22 the symbol portion of the indicia comprises a symbol group 34 located adjacent the left-hand end of this graduated scale. This symbol group comprises three symbol rows 34$^a$, 34$^b$ and 34$^c$. The numerical portion of the associated indicia comprises three number rows 35$^a$, 35$^b$ and 35$^c$. The associated indicia also comprises groups of directional arrows 36 associated with the number rows 35$^a$, 35$^b$ and 35$^c$ and preferably located at the ends of, and in alignment with, these rows.

The symbols of the row 34$^a$ of the symbol group 34 comprise two symbols written as the alternative expression $C_{\mu f}$ or $L_h$. This symbol row 34$^a$ is aligned with the number row 35$^a$ and indicates that the numerical values of this number row represent different values of the electrical properties designated by the symbols $C_{\mu f}$ and $L_h$ or, in other words, values of capacity in microfarads or values of inductance in henrys. The numbers appearing in the number row 35$^a$ cover a range of decimal-scale numerical values appropriate for the values of capacitance which are likely to be encountered in the solution of the problems when the capacitance is expressed in microfarads, and likewise, are appropriate for the values of inductance to be encountered when the inductance is expressed in henrys.

The intermediate symbol row $34^b$ contains only the single symbol $L_{mh}$ which represents inductance in millihenrys and the number row $35^b$ aligned with this symbol provides decimal-scale numerical values appropriate for the problems to be encountered for expressing inductance in the units indicated by the associated symbol, namely, millihenrys.

The symbol row $34^c$ is similar to the symbol row $34^a$ but comprises two symbols in the alternative expression $C_{\mu\mu f.}$ or $L_{\mu h.}$ and which symbols signify that the numerical values of the aligned number row $35^c$ are to be read as values of capacitance in micromicrofarads or values of inductance in microhenrys.

The directional arrows 36 are provided to visually indicate the direction of increasing values for the number rows $35^a$, $35^b$ and $35^c$. All of the arrows 36 associated with these number rows point toward the left to indicate that the values of the numbers appearing in these rows increase along the rows progressively toward the left. The arrows 36 thus provide a quick visual designation of the direction along the number rows $35^a$, $35^b$ and $35^c$ in which the hairline 20, or the scale 24, should be moved for associating the same with numbers of successively increasing numeral value.

It should also be pointed out with respect to the numbers of the number rows $35^a$, $35^b$ and $35^c$ that the numbers of these rows are located opposite main graduation marks 32 of the scale 22, and that the numerical values represented by the numbers of the respective rows are decimal-scale values. It will also be observed that the numbers 2 and 5 designating the intermediate graduation marks $32^b$ of the scale 22 represent proportional values in the number rows for values falling between the numbers actually shown in the respective number rows. It can now also be explained that the numbers 2 and 5 associated with the intermediate graduations of the scale 22 are shown as increasing in value toward the left because the numbers of all of the number rows $35^a$, $35^b$ and $35^c$ increase in value in that direction.

The indicia associated with the graduated scale 23 of the lower body member 15 comprises a symbol group 38 located adjacent the left end of this scale and number rows $39^a$, $39^b$ and $39^c$ extending longitudinally along the scale. The symbol group 38 comprises three rows of symbols $38^a$, $38^b$ and $38^c$ located opposite the number rows $39^a$, $39^b$ and $39^c$ respectively. In this case the symbol rows consist of only one symbol each, the row $38^a$ containing the symbol $X_C$, the row $38^b$ containing the symbol $X_L$, and the row $38^c$ containing the symbol $f$.

The numbers of the number rows $39^a$, $39^b$ and $39^c$ are in the decimal scale and the numerical values of the numbers of the respective number rows are appropriate for the electrical properties represented by the symbols of the appurtenant symbol group 38. Thus, the numerical values of the number row $39^a$ are appropriate to designate different decimal-scale values of capacitive reactance, as represented by the symbol $X_C$ of the symbol row $38^a$. Similarly the numerical values of the number row $39^b$ represent different decimal-scale values of inductive reactance, as indicated by the symbol $X_L$ of the symbol row $38^b$, and the numerical values of the number row $39^c$ represent different decimal-scale values of oscillation frequency as indicated by the symbol $f$ of the symbol row $38^c$.

The numbers of the number rows $39^a$ and $39^b$ are located opposite the main graduations of the scale 23. The numbers shown in the number row $39^c$ comprise main numbers 40 in multiples of 10 located opposite the main graduations and secondary numbers 2, 3 and 6 located opposite the intermediate graduations and representing proportionate parts of the main numbers between which these secondary numbers appear.

The indicia associated with the graduated scale 23 also includes directional arrows associated with the number rows $39^a$, $39^b$ and $39^c$. In this case, two groups 41 of such arrows are provided and are located at the ends of the number rows. The arrows $41^a$ and $41^c$ located adjacent the number rows $39^a$ and $39^c$ point toward the right to indicate that the numerical values of the numbers of these number rows increase in value progressively toward the right along these number rows. Similarly, the arrows $41^b$ at the ends of the number row $39^b$ point toward the left to indicate that the numerical values represented by the numbers of this row increase progressively toward the left along the row.

The graduated scale 24 of the slide member 12 is provided with graduation marks of the same number and spacing as the graduation marks of the graduated scale 22, and the intermediate graduation marks $32^b$ are also provided with numbers 2 and 5. The numbers 2 and 5 serve the same purpose as was described above for the scale 22 but, in the case of the scale 24, they are arranged so that the numerical values represented by the intermediate graduations increase in amount toward the right along the scale to agree with the direction of value increase for the majority of the number rows described hereinafter as being associated with this scale. The graduated scale 24 is of the same length as the scale 22 and, accordingly, its graduations will register exactly with the graduations of the latter scale when the slide member 12 is positioned in the guideway 16 at the location shown in FIG. 1.

The indicia provided on the slide member 12 and associated with the graduated scale 24 comprises a symbol group 42 and number rows $43^a$, $43^b$ and $43^c$ extending along this graduated scale. The symbol group 42 comprises three rows of symbols $42^a$, $42^b$ and $42^c$ located in a longitudinally aligned relation with the respective number rows $43^a$, $43^b$ and $43^c$.

The symbol rows $42^a$, $42^b$ and $42^c$ consist of one symbol each; the row $42^a$ containing the symbol $f_{c.p.s.}$ designating oscillation frequency in cycles per second; the symbol row $42^b$ containing the symbol $f_{kc.}$ designating oscillation frequency in kilocycles per second; and the symbol row $42^c$ containing the symbol $f_{mc.}$ designating oscillation frequency in megacycles per second. The number rows $43^a$, $43^b$ and $43^c$ comprise numbers representing decimal-scale numerical values likely to be encountered in the solution of the above problems for electrical properties designated by the symbols opposite which these number rows are located. The numbers of the number rows $43^a$, $43^b$ and $43^c$ are located opposite the main graduations $32^a$ of the graduated scale 24.

The indicia associated with the graduated scale 24 also includes groups of directional arrows 45 located adjacent the number of rows $43^a$, $43^b$ and $43^c$, in this case adjacent the ends of these number rows. All of the arrows 45 point toward the right to indicate that the numerical values represented by the numbers of the number rows $43^a$, $43^b$ and $43^c$ increase in value toward the right along these rows.

The indicator marks 27, referred to above as being provided on the slide member 12, are associated with the graduated scale 24 and are used for taking readings from the graduated scale 23 or for co-operation with the latter scale to indicate a desired setting of the slide member 12. These indicator marks are here shown as being of the arrow type and disposed with the apex of the arrow pointing toward the graduated scale 23 and located at the extreme lower edge of the slide member. In the slide rule 10, the indicator marks 27 are used specifically for reading or setting values of reactance on the scale 23 and, accordingly, indicia is provided adjacent these indicator marks for designating different measurement units for the value of reactance being read or set on the latter scale.

In this case there are four of the indicator marks 27 shown and these marks are appropriately spaced along the portion of the slide member 12 on which the scale 24 is located. The indicator marks $27^a$ and $27^b$ are used for reading or setting values of capacitive reactance on the scale 23 and, accordingly, these two indicator marks are provided with associated indicia representing values of capacitive reactance. For this purpose the indicator mark $27^a$ is provided with the value designation symbol $X_C\Omega$ which designates capacitive reactance in ohms. The indicator mark $27^b$ is provided with the value designation symbol $X_C M\Omega$ designating capacitive reactance in megohms.

The indicator marks $27^c$ and $27^d$ are used for reading or setting values of inductive reactance on the graduated scale 23 and, accordingly, these indicator marks are provided with value designation symbols indicating inductive reactance. For this purpose the indicator mark $27^c$ is provided with the symbol $X_L \Omega$ designating inductive reactance in ohms, and the indicator mark $27^d$ is provided with the symbol $X_L M\Omega$ designating inductive reactance in megohms.

If desired, a suitable legend may be provided adjacent the row of indicator marks 27 to indicate the general purpose for which these marks are intended to be used. In this instance such a legend 50 has been provided and comprises the expression "Reactance Problems" to signify that this portion of the slide rule is intended for the general purpose of solving reactance problems.

The graduated scale 25 carried by the slide member 12 comprises graduations of the same number and spacing as those of the graduated scale 24 and is of the same length as the latter scale but is located on another portion of the slide member, in this case a portion located to the right of the graduated scale 24. The scale 25 is provided with the same indicating numerals 2 and 5 for its intermediate graduations as the scale 24, and these indicating numerals are arranged to increase in value toward the right the same as the 2 and 5 indicating numerals of the scale 24. The graduated scale 25 extends along the upper longitudinal edge of the slide member 12 so that, by movement of the slide member to the left, this scale can be brought into co-operation or registration with the graduated scale 22.

The indicia provided on the slide member 12 and associated with the graduated scale 25 comprises a symbol group 52 and number rows $53^a$, $53^b$ and $53^c$ extending longitudinally adjacent the graduated scale. The symbol group 52 comprises three symbol rows $52^a$, $52^b$ and $52^c$ located opposite the respective number rows $53^a$, $53^b$ and $53^c$.

The symbol rows and the individual symbols of the symbol group 52 are the same as the symbol rows and individual symbols of the above-described symbol group 34. Thus, the row $52^a$ comprises two symbols arranged to form the expression $C_{\mu f.}$ or $L_{h.}$ which designates capacitance in microfarads or inductance in henrys. The symbol row $52^b$ comprises the single symbol $L_{mh.}$ designating inductance in millihenrys. The symbol row $52^c$ comprises two symbols forming the expression $C_{\mu\mu f.}$ or $L_{\mu h.}$ which designates capacitance in micromicrofarads or inductance in microhenrys.

The number rows $53^a$, $53^b$ and $53^c$ comprise numbers in decimal-scale values and appropriate for designating different numerical values of the electrical properties represented by the symbols of the symbol group 52. The numbers of these rows are located opposite the main graduations 32 of the scale 25. The intermediate graduation numbers 2 and 5 of the scale 25 are used to indicate approximate numerical values occurring between the numerals shown in the number rows $53^a$, $53^b$ and $53^c$.

The indicia associated with the graduated scale 25 also includes groups of directional arrows 53 located at opposite ends of the number rows $53^a$, $53^b$ and $53^c$, and all of which arrows point toward the right to indicate that the numerical values represented by the numbers of these number rows increase toward the right along these number rows.

The indicator marks 28, previously referred to as being provided on the side member 12, are located on the portion of this slide member which carries the graduated scale 25 and consist of the indicator marks $28^a$, $28^b$ and $28^c$. These indicator marks are appropriately spaced apart along this portion of the slide member 12 and are here shown as being in the form of arrows disposed with the apices thereof pointing toward the lower body member 15 and located at the lower edge of the slide member 12.

The indicator marks 28 are used in co-operation with the graduated scale 23 and the indicia associated with the latter for reading or setting values of oscillation frequency. These indicator marks are accordingly provided with designations representing different measurement units of oscillation frequency. The indicator mark $28^a$ is provided with the symbol $f_{c.p.s.}$ designating oscillation frequency in cycles per second, the indicator mark $28^b$ is provided with the symbol $f_{kc.}$ designating oscillation frequency in kilocycles per second, and the indicator mark $28^c$ is provided with the symbol $f_{mc.}$ designating oscillation frequency in megacycles per second.

If desired a suitable legend can be provided adjacent the row of indicator marks 28 to indicate the general purpose for which these marks are intended. Such a legend 54 is shown on the slide member 12 and comprises the wording "Resonance Problems" to signify that the indicator marks 28 and their associated symbols are intended to be used in the solution of resonance problems.

With respect to the location of the indicator marks $27^a$, $27^b$, $27^c$ and $27^d$ on the slide member 12, it is explained that when the graduations of the graduated scales 22 and 24 are in exact registration, these indicator marks will lie at points along the graduated scale 23 which are located at 0.159 of the length of the main scale spaces opposite which these indicator marks then stand. Similarly, with respect to the location of the indicator marks $28^b$ and $28^c$ on the slide member 12, it is explained that when the graduations of the graduated scale 25 are in exact registration with the graduations of the scale 22, these indicator marks will lie at points along the scale 23 which are located at 0.318 of the length of the main scale spaces opposite which these indicator marks then stand. The indicator mark $28^a$ is proportionately located on the slide member 12 relative to the indicator marks $28^b$ and $28^c$ but falls outside of the length of the graduated scale 23 for the reason that the progression of numerical values of the number row $39^c$ has not been extended for the distance which would be necessary to serve this indicator mark $28^a$.

FIGS. 3, 4 and 5 of the drawings show the slide rule 10 with the movable components thereof in different settings to illustrate the manner of using the slide rule in the solution of three different typical problems in radio electronics. FIGS. 3, 4 and 5 have been drawn so as to be self-explanatory in regard to the illustrated use of the slide rule 10 for solving these three typical problems, but a brief explanation is given hereunder of the procedure represented in these views.

The problem being solved in FIG. 3 is a resonance problem and, for that reason, the portion of the slide member 12 carrying the graduated scale 25 has been moved into co-operation with the graduated scale 22. The problem here illustrated relates to a situation in which an inductance of 40 millihenrys is connected in parallel circuit with a capacitance of 0.03 microfarad and the problem briefly stated is to determine at approximately what frequency in cycles per second this parallel circuit will resonate.

As the first step in the solution of this problem, FIG. 3 shows that the indicator 13 has been moved to a position along the graduated scale 22 at which the hairline 20 is at a setting of 0.03 microfarad capacitance and which setting is determined by reference to the symbol line 34$^a$ and its appurtenant number row 35$^a$. The exact setting of the hairline 20 at this value is determined, first, by referring to the main numerical values of this number row and, second, by referring to the numbers associated with the intermediate graduations of the scale 22. This setting of the hairline 20 is designated by the broken-line arrow 55.

After the hairline 20 has been thus set at the proper location on the graduated scale 22, the slide member 12 is moved to bring a setting value thereof representing 40 millihenrys of inductance into register with the hairline. This value of inductance is located on the slide member 12 as being in the number row 53$^b$ which is opposite the symbol row 52$^b$. The general location for this setting of the slide member 12 is determined from the numerals of the number row 53$^b$, and the more exact setting is determined from the intermediate graduations of the graduated scale 25. The setting of the slide member 12 as thus determined, is shown in FIG. 3, and is indicated by the broken-line arrow 56.

The final step in the solution of the problem illustrated in FIG. 3 is to read the oscillation frequency directly from the numerical values of the number row 39$^c$. Thus, if the oscillation frequency is desired in cycles per second, the reading is taken from the number row 39$^c$ as indicated by the broken-line arrow 57 and at the point designated by the indicator mark 28$a$. This frequency value would be approximately 5,000 cycles per second. If the oscillation frequency is desired in kilocycles, the reading is taken from the number row 39$^c$ as indicated by the broken-line arrow 58 and at the point thereof opposite the indicator mark 28$^b$. This frequency value would be approximately 5 kilocycles.

In reading the value of oscillation frequency from the number row 39$^c$, it may be desirable to shift the hairline 20 to a position in register with the indicator mark being used because the hairline will then extend across the number row 39$^c$ at the point where the frequency value is to be read. This relocation of the hairline 20 in register with the indicator mark 28$^a$ is represented in FIG. 3 by the broken line 20$^a$, and the relocation of the hairline in register with the indicator mark 28$^b$ is represented by the broken line 20$^b$.

FIG. 4 illustrates the use of the slide rule 10 in solving a problem where the value of the capacitance of an oscillation circuit is desired to be obtained. A typical problem of this kind would be to find the approximate capacitance value which would be required in an electrical circuit having 350 microhenrys of inductance to resonate at an oscillation frequency of 200 kilocycles per second. In the solution of this problem as represented in FIG. 4, the slide member 12 is moved to a position where the indicator mark 28$^b$ will co-operate with the graduated scale 23 of the lower body member 15 to designate on the latter the desired value of resonant frequency. This setting for the indicator mark 28$^b$ is at a point along the number row 39$^c$ corresponding with the 200 kilocycles oscillation frequency value, as is represented by the broken line 60 and the broken-line arrow 61. The indicator 13 is then moved along the slide rule to bring the hairline 20 to a point on the number row 35$^c$ and the graduated scale 22 at which the hairline will designate a reading of 350 microhenrys, as indicated by the broken-line arrow 62. The desired value of capacitance is then read directly from the indication given by the hairline 20 on the number row 53$^a$ and the graduated scale 25. The taking of the desired reading of capacitance from the number row 35$^c$ and the graduated scale 22, namely the value of approximately 0.003 microfarad, is indicated by the broken-line arrow 63.

FIG. 5 of the drawings illustrates the use of the slide rule 10 in the solution of a reactance problem in which it is desired to determine the approximate value of capacitive reactance in ohms of a capacitor of 0.005 microfarad capacitance when used in an oscillation circuit which is resonant at a frequency of 3 megacycles. This problem is solved by first setting the hairline 20 at a point along the number line 35$^a$ and graduated scale 22 corresponding with the given value of 0.005 microfarad capacitance, as indicated by the broken-line arrow 65. The slide member 12 is then moved to bring the value of 3 megacycles of the number row 43$^c$ into register with the hairline 20, as indicated by the broken-line arrow 66. The desired approximate value of capacitive reactance, namely 10 ohms, is then read directly from the number line 39$^a$ and the graduated scale 23 at the point therealong indicated by the indicator mark 27$^a$. The reading of the desired approximate value of capacitive reactance as the last step of this solution is indicated by the broken line 67 and by the broken-line arrows 68 and 69.

FIG. 2 of the drawings shows a modified construction provided by this invention for a slide rule 70 of a form generally similar to the slide rule 10, but in which a composite scale and indicia data is provided on the slide member 12 for solving reactance and resonance problems instead of the two scales shown in FIG. 1.

In the modified slide rule 70, graduated scales 72 and 73 are provided on the upper and lower body members 14 and 15 and correspond with the scales 22 and 23 of the slide rule 10. Symbol groups 34 and 38 are also provided on the members 14 and 15 and comprise the same symbols as the corresponding symbol groups of the slide rule 10. Number rows 74$^a$, 74$^b$ and 74$^c$ are provided on the upper body member 14 in alignment with the symbol rows of the symbol group 34 and correspond with the number rows 35$^a$, 35$^b$ and 35$^c$ of the slide rule 10. Likewise, number rows 75$^a$, 75$^b$ and 75$^c$ are provided on the lower body member 15 and correspond with the number rows 39$^a$, 39$^b$ and 39$^c$ of the slide rule 10. The numerical values, however, of the number rows 74$^a$, 74$^b$ and 74$^c$ and of the number rows 75$^a$, 75$^b$ and 75$^c$ are somewhat different from the numerical values of the corresponding number rows of the slide rule 10 but still are decimal-scale values and are appropriate for the composite character of the scale and indicia data provided on the slide member 12 of the modified slide rule 70.

The slide member 12 carries a graduated scale 77 which corresponds with the graduated scale 24 of the slide rule 10 and number rows 78$^a$, 78$^b$ and 78$^c$ corresponding with the number rows 43$^a$, 43$^b$ and 43$^c$. The decimal-scale numerical values of the number rows 78$^a$, 78$^b$ and 78$^c$ are somewhat different, however, by reason of the composite character of the indicia provided on the modified slide rule 70.

The slide member 12 of the modified slide rule 70 also carries a symbol group 79 which includes all of the symbols of the symbol group 52 and all of the symbols of the symbol group 42. The symbol group 79 comprises three symbol rows 79$^a$, 79$^b$ and 79$^c$ in aligned relation with the three number rows 78$^a$, 78$^b$ and 78$^c$ respectively.

The slide member 12 of the modified slide rule 70 also carries two groups of indicator marks for co-operation with the graduated scale 73 of the lower body member 15. One group of these indicator marks comprises the marks 80$^a$, 80$^b$ and 80$^c$ and are provided with the same oscillation frequency symbol designations as the indicator marks 28$^a$, 28$^b$ and 28$^c$ of the slide rule 10. The other group of indicator marks comprise the marks 81$^a$ and 81$^b$ which are used in the solution of reactance problems and serve the same purpose as the four indicator marks 27$^a$, 27$^b$, 27$^c$ and 27$^d$ of the slide rule 10. In this case, however, the indicator mark 81$^a$ is provided with symbols designating both capacitive reactance and inductive reactance, namely the symbols $X_C\Omega$ and $X_L\Omega$. Similarly the indicator mark 81$^b$ is provided with symbols designating both capacitive reactance and inductive reactance, namely the symbols $X_C M\Omega$ and $X_L \Omega$.

The modified slide rule 70 possesses the advantage that when the graduated scales and indicia for the solution of both reactance and resonance problems are combined on the slide member 12, there is a saving of space and the slide rule can either be of a shorter length or, if of a full length, a greater portion of its surface will be available for other scales and data.

From the accompanying drawings and the foregoing detailed description it will now be understood that this invention provides a novel slide rule which can be used to considerable advantage in the solution of mathematical problems of the kind frequently encountered in radio electronics and involving the properties of oscillation circuits. Since many of the advantages of this novel slide rule have already been pointed out above, they need not be here repeated.

Although the novel slide rule provided by this invention has been illustrated and described herein to a somewhat detailed extent, it will be understood, of course, that the invention is not to be regarded as being limited correspondingly in scope but includes all changes and modifications coming within the terms of the claims hereof.

Having described my invention, I claim:

1. A slide rule for solving electrical problems in capacitive reactance, inductive reactance and resonant frequency comprising a body member and a relatively movable slide member supporting said body member and having two parallel edges adjacent thereto said body member having two scales thereon, one said scale on said body member being disposed adjacent one edge of said slide member and being representative of a plurality of unit values of capacity and inductance and having equally spaced first indicia representing decimal scale multiples of said unit values, respectively, and other indicia intermediate said first indicia and dividing the space between said first indicia in a direction from one said first indicia to the next adjacent said first indicia in the ratio of 3 parts, 4 parts and 3 parts, the other said scale on said body member being disposed adjacent said other edge of said slide member and being representative of unit values of inductive reactance, capacitive reactance and frequency and having equally spaced first indicia representing decimal scale multiples of said unit values, respectively, and other indicia intermediate said first indicia of said other scale and dividing the space between adjacent said first indicia of said other scale into equal parts, said slide member having two longitudinally aligned scales adjacent said one edge, said slide member scales being adapted to be moved into cooperative relationship with said first scale of said body member, each said slide member scale having indicia spaced as in said first scale, said indicia of one said slide member scale representing decimal scale multiples of unit values of frequency, and said indicia of said other slide member scale representing decimal scale multiples of a plurality of unit values of capacity and inductance, said slide member having longitudinally spaced arrows located at predetermined points on said other edge and relative to said slide member scales, respectively, to indicate the place on said other scale of said body member at which the answer to the electrical problem being solved is read.

2. The slide rule according to claim 1 with means indicating the direction in which the unit values assigned to said indicia of said scales, respectively, increase.

3. A slide rule for solving electrical problems in capacitive reactance, inductive reactance and resonant frequency comprising a body member and a relatively movable slide member supporting said body member and having two parallel edges adjacent thereto, plurality of scales on said body member, one said scale on said body member being disposed adjacent one edge of said slide member and being representative of a plurality of unit values of capacity and inductance and having equally spaced first indicia representing decimal scale multiples of said unit values, respectively, and other indicia intermediate said first indicia and dividing the space between said first indicia in a direction from one said first indicia to the next adjacent said first indicia in the ratio of 3 parts, 4 parts and 3 parts, a second said scale on said body member disposed adjacent said other edge of said slide member and being representative of unit values of inductive reactance, capacitive reactance and frequency and having equally spaced first indicia representing decimal scale multiples of said unit values, respectively, and other indicia intermediate said first indicia of said second scale and dividing the space between adjacent said first indicia of said second scale into equal parts and at least one on said slide member scale adjacent said one edge thereof, said slide member scale having indicia spaced as in said first scale, said indicia of said slide member scale representing decimal scale multiples of unit values of at least one of the electrical properties of frequency, capacity and inductance.

4. The slide rule according to claim 3 in which said slide member has means located at predetermined position on said other edge and relative to said slide member scale to indicate the place on said other scale of said body member at which the answer to the electrical problem being solved is read.

5. The slide rule according to claim 3 with means indicating the direction in which the unit values assigned to said indicia of said scales, respectively, increase.

6. A slide rule for solving problems in the electrical field comprising a first member and a relatively movable second member supported thereon and having two edges adjacent said first member, a first scale on said first member, said first scale being disposed in operative relation with a said edge of said second member and being representative of unit values of capacity and inductance and having equally spaced first indicia representing decimal scale multiples of said unit values, respectively, a second scale on said first member, said second scale being disposed in operative relations with the other said edge of said second member and being representative of unit values of at least one of the electrical properties chosen from the group consisting of inductive reactance, capacitive reactance and frequency and having equally spaced first indicia representing decimal scale multiples of said unit values and at least one scale on said second member adjacent said one edge thereof, said second member scale having indicia spaced as in said first scale, said indicia of said second member scale representing decimal scale multiples of unit values of at least one of the electrical properties chosen from the group consisting of frequency, capacity and inductance.

7. The slide rule according to claim 6 with other indicia intermediate said first indicia of said first scale and dividing the space between adjacent said first indicia in proportions which are the same without regard to the direction traversed from one said first indicia to the next adjacent said first indicia.

8. The slide rule according to claim 7 in which said other indicia divide said space between said adjacent first indicia in the proportion of 3 parts, 4 parts and 3 parts.

9. The slide rule according to claim 6 with other indicia intermediate said first indicia of said second scale and dividing the space between adjacent said first indicia in proportions which are the same without regard to the direction traversed from one said first indicia to the next adjacent said first indicia.

10. The slide rule according to claim 9 in which said other indicia are equally spaced between said adjacent first indicia.

11. The slide rule according to claim 10 with one said other indicia intermediate said adjacent first indicia.

12. The slide rule according to claim 6 in which said unit values of capacity and inductance comprise at least one pair of values chosen from the paired group consisting of capacity in mircrofarads and inductance in henrys, and capacity in micromicrofarads and inductance in millihenrys.

13. The slide rule according to claim 6 in which said second member has means located at predetermined position on said other edge and relative to said second member scale to indicate the place on said second scale of said first member at which the answer to the electrical problem being solved is read.

14. The slide rule according to claim 6 with means indicating the direction in which the unit values assigned to said indicia of said scales, respectively, increase.

15. In a slide rule having a plurality of members movable with respect to each other the improvement of a scale representative of a plurality of unit values of capacity and inductance and having equally spaced first indicia representing decimal scale multiples of said unit values, respectively.

16. The side rule according to claim 15 wherein said unit values of capacity and inductance comprise at least one pair of values chosen from the paired group consisting of capacity in microfarads and inductance in henrys, capacity in micromicrofarads and inductance in millihenrys, and capacitive reactance and inductive reactance.

References Cited in the file of this patent

UNITED STATES PATENTS

| | | |
|---|---|---|
| 703,437 | Merritt | July 1, 1902 |
| 2,170,144 | Kells et al. | Aug. 22, 1939 |

FOREIGN PATENTS

| | | |
|---|---|---|
| 108,197 | Great Britain | July 27, 1917 |

OTHER REFERENCES

"Special Slide Rules," J. N. Arnold, Purdue University Extension Series No. 32, September 1933, vol XVII, No. 5, pages 10–33.

"Pocket Reactance and Resonance Calculator," by V. J. Tyler, pages 560–562 inclusive, vol. 59, Wireless World, December 1953.